Figure 1:
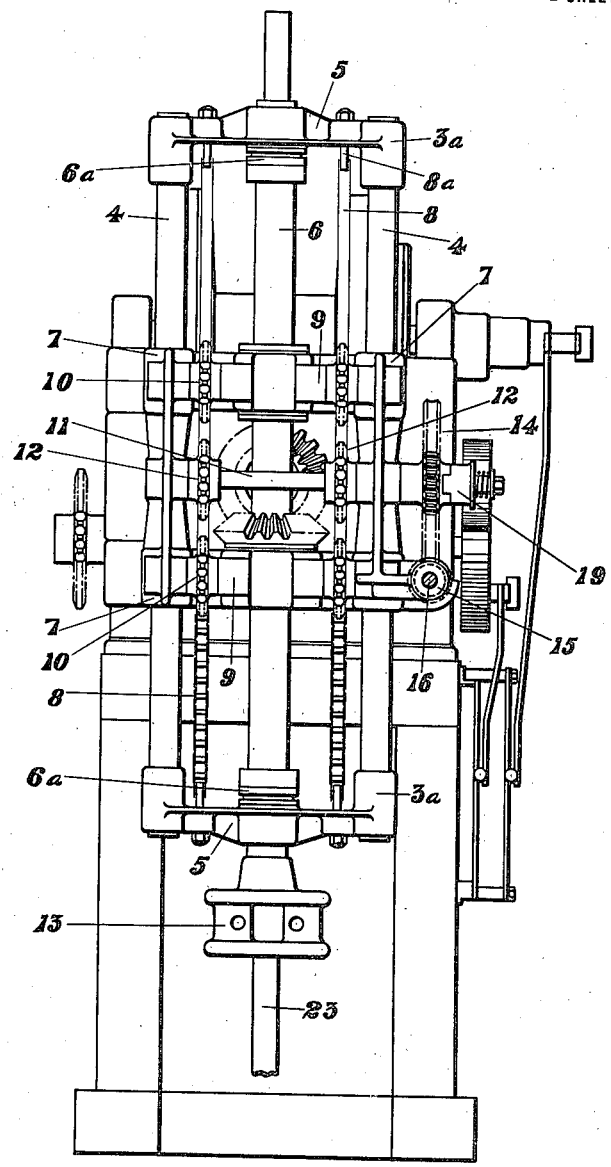

C. C. HANSEN.
FEEDING MEANS FOR CORE DRILLS.
APPLICATION FILED JAN. 22, 1918.

1,317,875.

Patented Oct. 7, 1919.
2 SHEETS—SHEET 1.

INVENTOR.
CHAS. C. HANSEN
BY *Joseph K. Schofield*
ATTORNEYS.

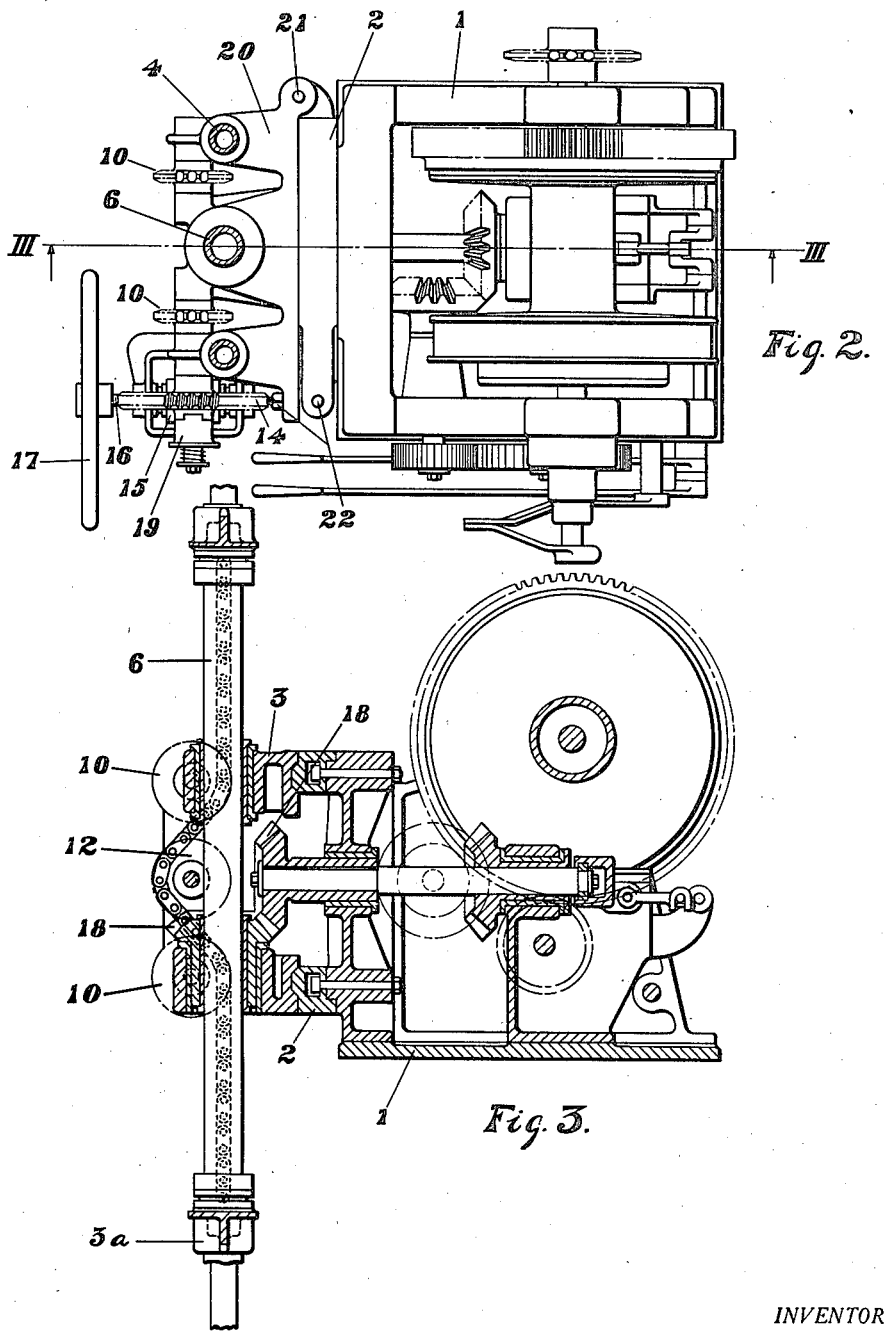

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

FEEDING MEANS FOR CORE-DRILLS.

1,317,875.  Specification of Letters Patent.  Patented Oct. 7, 1919.

Application filed January 22, 1918. Serial No. 213,184.

*To all whom it may concern:*

Be it known that I, CHARLES C. HANSEN, a citizen of the United States, residing at Easton, in the county of Northampton and State of Pennsylvania, have invented a certain new and useful Improvement in Feeding Means for Core-Drills, of which the following is a specification.

This invention relates to core drills and especially to means for feeding the drilling cutter to the work when the drill is being started.

The objects of my invention are to improve the form of feeding means for drills of this type; to render the pressure of the drill against the material being bored sensitive to the operator and to provide a simple and effective means for sensitively feeding the cutter when the drill is started which is so mounted that it may easily be thrown out of operation when the weight of the cutter and drill rods is sufficient to provide the proper amount of pressure for the drilling.

In the drawings annexed hereto and forming a part of this specification,

Figure 1 is a front view of the complete drill including the improved feeding means shown in elevation;

Fig. 2, a top plan view of the same, some parts being omitted; and

Fig. 3, a cross section in elevation, taken on the line 3—3 of Fig. 2.

The construction comprises a frame 1 which may be carried or supported by any convenient means, not shown. The frame 1 is provided with an annulus 2 mounted vertically on one side of the frame by means of which the drill head 3 may be attached to the frame 1 in such a manner that it may be adjusted to any position in a vertical plane. Mounted in the drill head 3 is a carriage 3ª which is adapted to slide through holes provided in the drill head 3. As the carriage 3ª is generally used to slide vertically for the purpose of drilling vertical holes, it is shown in the drawings in that position. This carriage 3ª comprises in the present instance two side rods 4, and top and bottom cross heads 5. The side rods 4 guide and support the drill spindle 6 and are moved vertically therewith in a manner presently to be described. The drill head 3 is provided with bearings 7 through which the guide rods 4 slide. Extending between the top and bottom cross heads 5 are flexible members 8, preferably in the form of chains, by means of which the guiding frame 3ª and drill spindle are moved vertically or obliquely upwardly or downwardly. Preferably these chains 8 are made adjustable at their upper ends, by means of take-up bolts 8ª, in order that they may be tightened or loosened.

The drill head 3 also carries four short cross shafts 9, each of which is provided with an idler sprocket wheel 10 meshing with a feed chain 8, the sprocket wheels 10 being loosely mounted on the shafts 9. Another shaft 11 is carried by the drill head 3 on which are mounted two sprocket wheels 12, each of which is keyed to the shaft 11. As clearly shown in Fig. 3, the flexible feed chains 8 extend partly around the sprocket wheels 10 and over the sprocket wheel 12, the sprocket wheels 10 acting merely to hold the feed chains 8 closely in engagement with the sprocket wheels 12 and in alinement with the spindle 6. It will be seen from the above description that rotation of the sprocket wheels 12 by means of the shaft 11 will cause a vertical movement of the guiding frame or carriage 3ª and drill spindle 6 to which drill rods 23 may be attached by means of the clutch 13.

The shaft 11 has fastened to it at one end a worm gear 14 which meshes with a worm 15 carried by a shaft 16 to which is fastened a hand wheel 17. Rotating the hand wheel 17 thus raises and lowers the drill spindle 6 by means of the mechanism above described. It will be obvious that the pressure with which the drill spindle 6 is forced downwardly or upwardly may be very readily adjusted by the operator and that it will always be accurately known or felt by the operator. By this means the drill can be advanced or withdrawn by rotating the hand wheel 17 so that the pressure may be maintained constant and at the most efficient point. Means for rotating the drill spindle are shown which comprise the usual bevel gears 18 common to this type of drill. These form no part of the present invention, so that a further description of them is unnecessary. Preferably ball bearings 6ª are provided at top and bottom of the carriage 3ª to facilitate rotation of the spindle 6.

When the drill has been advanced a considerable distance the weight of the drill rods and cutter is sufficient to provide pressure to continue the cutting and the feeding means above described are no longer required to feed the drill until a new hole is started. For this reason a clutch 19 is provided on shaft 11 so that the worm gear 14 and hand wheel 17 may be thrown out of engagement with the shaft 11, leaving the carriage 3ª free to move downwardly by reason of its own weight. The carriage 3ª, however, continues to guide and direct the drill spindle after the clutch 19 has been thrown out of engagement with the shaft 11.

For convenience in removing the drill rods and cutters the entire feeding means are mounted upon the drill head 3 by means of a swing gate 20 hinged at 21 to the drill head 3 and locked in place by bolts shown at 22, which allow the carriage 3ª to be thrown out of its operative position and away from the line of the hole being bored, to facilitate removing the rods and cutter.

It is to be understood that while the present showing and description disclose only one specific embodiment of the present invention, other forms and modifications are included within the spirit and scope thereof, as expressed in the appended claims.

What I claim is:

1. In a drill of the character described, a drill head, a carriage mounted upon said drill head and adapted to slide upwardly and downwardly, said carriage carrying flexible members extending from top to bottom and engaging means mounted on the drill head whereby said carriage may be raised and lowered.

2. In a drill of the character described, a drill head, a carriage mounted upon said drill head and adapted to slide vertically, said carriage carrying a central rotating drill spindle or rod, flexible members mounted on said carriage extending from top to bottom and engaging means mounted on the drill head whereby rotation of said means permits raising and lowering of said carriage.

3. In a drill of the character described, in combination, a supporting base member or frame, a rotating drill spindle, a carriage mounted in said base member, said carriage guiding and supporting said drill spindle, flexible members mounted on said carriage and means engaging said flexible means whereby the frame and spindle may be raised and lowered.

4. In a drill of the character described, in combination, a supporting base member or frame having sprocket wheels mounted thereon, a rotating drill spindle, a carriage carrying the drill spindle mounted to slide vertically in said base member, flexible members carried by said carriage, said flexible members engaging said sprocket wheels whereby said carriage may be raised and lowered under manually adjustable pressure.

In testimony whereof I have hereunto set my hand.

CHARLES C. HANSEN.